UNITED STATES PATENT OFFICE.

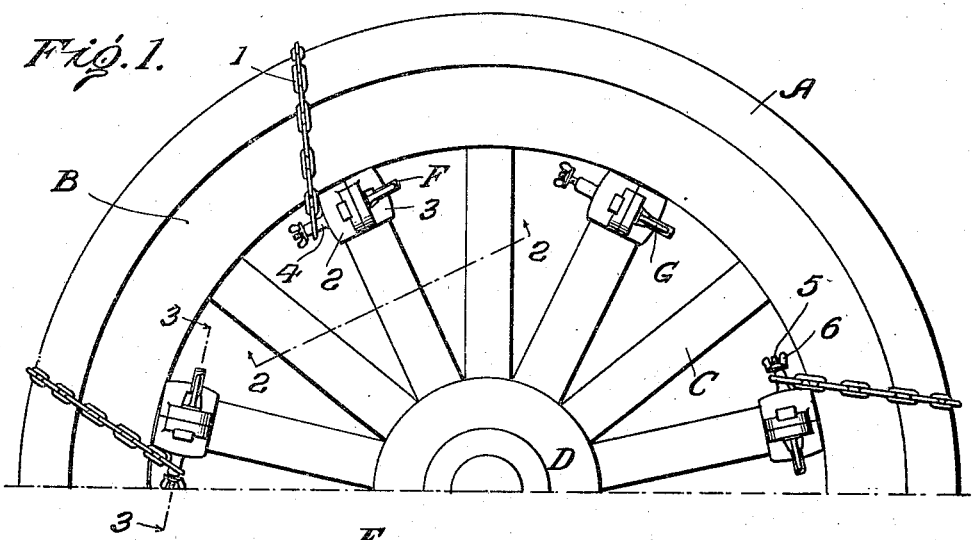

WILLIAM H. McLAUGHLIN, OF HARTFORD, CONNECTICUT, ASSIGNOR TO CASSIUS S. CHASE, OF HARTFORD, CONNECTICUT.

FASTENING MEANS.

1,276,786.         Specification of Letters Patent.     Patented Aug. 27, 1918.

Application filed April 21, 1917.   Serial No. 163,727.

*To all whom it may concern:*

Be it known that I, WILLIAM H. McLAUGHLIN, a citizen of the United States, residing at Hartford, in the county of Hartford and State of Connecticut, have invented certain new and useful Improvements in Fastening Means, of which the following is a specification.

This invention relates to fastening means primarily intended to be used with anti-skidding devices of the fixed point type to be used in combination with vehicle wheels, more particularly to that class of such devices employing clamping plates fitting around the spokes of a wheel and carrying means between the spokes to be connected to the end or terminal links of anti-skidding chains passing around the tire.

Heretofore it has been usual to provide a pair of connectors, one for each end of each chain engaging the opposite sides of said means, usually an eye or loop, carried by said clamping plates.

The primary object of the present invention is to dispense with all need for these separate connector devices, which are easily lost by reason of their separability, by forming the means carried by the clamping plates in such manner that they will perform the two functions of attaching means or eyes and connectors. A further object is to provide means, devoid of springs or resilient parts, for preventing the escape of the terminal links or eyes of such chains after attachment. Other objects are to brace the attaching hooks, to prevent the terminal links from moving off of their respective hooks or becoming entangled by providing a partition or dividing element between the spaces in the hooks, and to otherwise improve the construction, while reducing the cost of manufacture of such articles, all of which objects are attained by the combination, construction and arrangement of parts all as hereinafter more particularly set forth, described and claimed.

In the accompanying drawings:

Figure 1 represents a side elevation of a segment of a wheel provided with anti-skidding devices embodying my invention, one of the gripping or anti-skidding chains being omitted;

Fig. 2, a section on line 2—2 of Fig. 1, showing a modified form;

Fig. 3, a section on line 3—3 of Fig. 1, greatly enlarged, showing said modified form; and Fig. 4, a view, similar to Fig. 3, of the preferred form.

Referring now in detail to the drawings, A designates the tire, B the felly, C the spokes and D the hub.

The front plate 2 of the clamp is formed with hooks 4 and with a perforated boss 7 where the base equi-distant between the free ends of said hooks would be located. The inner face of the plate 2 is recessed adjacent to, and surrounding, said perforation to receive the correspondingly shaped head 8, which may be angular as shown, of a bolt 9 receiving a wing nut 10 of ordinary form on its outer or forward end. The front face of the boss 7 is provided with an angular forwardly presented lug or projection 11 adapted to be received by a similarly shaped recess in the shank of a guard or keeper 12 mounted on said bolt between the boss 7 and nut 10 and free to rotate on said bolt, except when in locked position.

This keeper may be of any suitable form or design, it being understood that its arms are to be of sufficient length to extend to the tips of the hooks 4, and its shank of sufficient length to reach to the front face of the boss 7 so that its recess will completely receive the angular lug or projection 11 on said boss 7 when the arms of the keeper are in normal position and the nut 10 is turned on so as to hold the keeper against longitudinal movement, the engagement of the recess and lug 11 preventing rotary motion when the keeper is thus held.

In use, the nut 10 will be unscrewed sufficiently to allow the keeper 11 to be moved forward on the bolt 9 a short distance so that the recess in the rear end of the shank thereof will be clear of the lug 11. The keeper may then be turned or rotated freely on the bolt 9 so as to open the spaces between the ends of the hooks 4 and the shank of the keeper, permitting the terminal links of an anti-skidding chain 1 to be applied to or removed from said hooks 4, when the keeper is to be turned back to normal position where its arms close said spaces and then moved rearwardly so that said recess will completely receive the lug 11, and the nut 10 is then to be turned up tight, securely locking the keeper in this, its normal, position.

When employed in the use primarily intended by applicant the front plate 2 will be used with a complementary plate 3, both of said plates being provided with a rubber treated textile fabric lining E to get a good frictional grip on the surface of the spoke without marring it. Said plates 2 and 3 are provided with perforated integral end flanges which receive the bolts F tightened by means of wing nuts G to hold the clamp plates on the spoke.

In the modified form illustrated in Figs. 2 and 3 the front plate 2 is formed with the hooks 4, as above described, but with a preferably integral stem 5 projecting from a point of said plate 2 where the boss 7 of the preferred form would be located and at right angles to said plate between the free ends of said hooks 4. A wing nut 6 having an enlarged face or annular flange is adapted to be screwed on the end portion of the stud 5 which projects beyond the front faces of the hooks 4 and is intended to be screwed thereon until its face bears firmly on the forward faces of the hooks, serving in such position to close the gaps or intervals between the ends of said hooks and said stud and at the same time to brace the free ends of said hooks against any strain or twisting action by the chains which might have a tendency to snap these hooks off.

The constructions described will permit the use of cast metal for all parts, though any suitable material may be used for any part.

Having thus described my invention, what I claim as new and desire to secure by Letters Patent is:

1. A plate having two hooks and a screw-threaded part projecting from said plate, in combination with a keeper freely mounted on said part and a nut screwing on the end of said part for holding said keeper in proper position.

2. A plate having two hooks and a bolt passing through said plate and projecting between the free ends of said hooks, in combination with a keeper freely mounted on said bolt and having arms adapted to close the spaces between the free ends of said hooks and said bolt, said plate and said keeper being provided with a coöperating lug and recess to prevent the turning of said keeper when held in its normal position longitudinally of said bolt, and a nut screwing on the end of said bolt and adapted to hold the keeper in such position.

3. A plate having two projections, an element having engagement with said plate and projecting between the free ends of said projections, in combination with a keeper mounted on said element, adapted to be moved thereon toward or from said plate and to be turned on said element, and having arms in normal position closing the spaces between the free ends of said projections and said element, said plate and said keeper being provided with a coöperating lug and recess to prevent the turning of said keeper when held in its normal position, and means working on said element to hold said keeper in such position.

In testimony whereof, I have signed my name to this specification.

WILLIAM H. McLAUGHLIN.